(12) United States Patent
Doidge et al.

(10) Patent No.: US 8,862,797 B2
(45) Date of Patent: Oct. 14, 2014

(54) REDUCING DELAY AND DELAY VARIATION IN A BUFFER IN NETWORK COMMUNICATIONS

(75) Inventors: Dennis Albert Doidge, Apex, NC (US); Juan-Carlos Calderon, Fremont, CA (US); Jean-Michel Caia, Plymouth, CA (US)

(73) Assignee: Cortina Systems, Inc., Sunnyvale, CA (US)

( * ) Notice: Subject to any disclaimer, the term of this patent is extended or adjusted under 35 U.S.C. 154(b) by 318 days.

(21) Appl. No.: 13/276,308

(22) Filed: Oct. 18, 2011

(65) Prior Publication Data

US 2014/0164546 A1    Jun. 12, 2014

(51) Int. Cl.
*G06F 5/00*    (2006.01)
*G06F 5/14*    (2006.01)

(52) U.S. Cl.
CPC .................................... *G06F 5/14* (2013.01)
USPC ............................. 710/57; 710/56; 710/310

(58) Field of Classification Search
CPC ........................................................ G06F 5/14
USPC ............................................. 710/57, 56, 310
See application file for complete search history.

(56) References Cited

U.S. PATENT DOCUMENTS

| | | | |
|---|---|---|---|
| 5,402,452 A | 3/1995 | Powell et al. | |
| 6,952,739 B2 * | 10/2005 | Fritz et al. | 709/232 |
| 6,988,160 B2 * | 1/2006 | Daniel et al. | 710/310 |
| 7,564,875 B2 | 7/2009 | Linkewitsch et al. | |
| 2007/0220184 A1 * | 9/2007 | Tierno | 710/52 |
| 2008/0044183 A1 * | 2/2008 | Perkins et al. | 398/58 |
| 2008/0270744 A1 * | 10/2008 | Hashimoto | 711/217 |

OTHER PUBLICATIONS

MAXIM, Elastic Store Operation, Application Note 3208, Apr. 26, 2004, Four Pages.
ITU Optical Transport Network (OTN) Tutorial (Entire Document). Author and Date Unknown. 62 Pages.
ITU International Telecommunication Union, ITU-T Telecommunication Standardization Sector of ITU, G.872 (Feb. 1999), Series G: Transmission Systems and Media, Digital Systems and Networks, Digital transmission systems—Digital networks—Optical transport networks, Architecture of optical transport networks (Entire Document). 37 Pages.
Gorshe, Steve, PMC Optical Transport Networks Technology White Paper, A Tutorial on ITU-T G.709 Optical Transport Networks (OTN), Technology White Paper, Issue 1: Jul. 2009 (Entire Document). 77 Pages.

* cited by examiner

*Primary Examiner* — Ernest Unelus
(74) *Attorney, Agent, or Firm* — Amin, Turocy & Watson, LLP

(57) ABSTRACT

There are disclosed systems and methods for reducing the average delay and the average delay variation of network communication data in a buffer. The buffer comprises a plurality of memory entries, and associated with the buffer is a read point and a write pointer. The buffer has a depth defined as the number of memory entries in the buffer between the memory entry pointed to by the read pointer and the memory entry pointed to by the write pointer. In one embodiment, at least one of the read pointer and the write pointer is initially set to establish the depth of the buffer to be a first value. The variation of the depth of the buffer is then monitored for a predetermined period of time as network communication data flows through the buffer. The depth of the buffer is then reduced based upon this monitoring.

20 Claims, 12 Drawing Sheets

| Column | | | | | | | |
|---|---|---|---|---|---|---|---|
| Row | 1 | 7 8 | 14 15 | 16 17 | | 3824 3824 | 4080 |
| 1 | FA | OH OTUk | OH | OPUk | OPUk Payload | | OTUk FEC |
| 2 | ODUk | OH | | OH | (4 x 3808 bytes) | | (4 x 256 bytes) |
| 3 | | | | | | | |
| 4 | | | | | | | |

FIG. 9A

| FA | OH | OTUk | OH |
|---|---|---|---|

Column #

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | FAS | | | | | | MFAS | SM | | | GCC0 | | RES | |

FIG. 9B

REDUCING DELAY AND DELAY VARIATION IN A BUFFER IN NETWORK COMMUNICATIONS

FIELD

This application relates to buffering data in a network.

BACKGROUND

Buffers are often used in networks for buffering network communication data. For example, in Optical Transport Networks (OTNs) a circular buffer or elastic store is typically used when mapping digital data to an OTN frame or vice versa, for example, in the conversion between a client's network communication data and the OTN transport frames.

As an example, a client may provide Ethernet data to an OTN network termination unit. The OTN network termination unit maps this Ethernet data to OTN frames for transmission over the OTN. The OTN network termination unit includes an elastic store that receives the Ethernet data at the rate provided by the client (e.g. 40 Gbps). The network termination unit reads the stored Ethernet data out of the elastic store and maps this Ethernet data to OTN frames at the rate of the OTN network.

The rate at which the Ethernet data is provided by the client and written to the elastic store may be relatively constant. However, the rate at which the Ethernet data is read from the elastic store and mapped to OTN frames is typically bursty in nature. This is because an OTN frame includes not only the encapsulated client data, but also overhead and forward error correction (FEC) data. Therefore, part of the transmission time of the OTN frame is dedicated to this overhead and FEC, and during this transmission time none of the client's data is transmitted. Thus, the client's data is read from the elastic store in bursts interspersed between periods of time during which none of the client's data is read (when overhead/FEC redundancy is being transmitted).

On average, the rate at which the client's data is written to the elastic store and the rate at which the client's data is read from the elastic store must be substantially the same in order to prevent constant buffer overflow or buffer underflow. However, the different rates at which data is written to the elastic store and at which the data is read from the elastic store during short-term periods of time require the elastic store to buffer the data.

BRIEF DESCRIPTION

Figure 1:
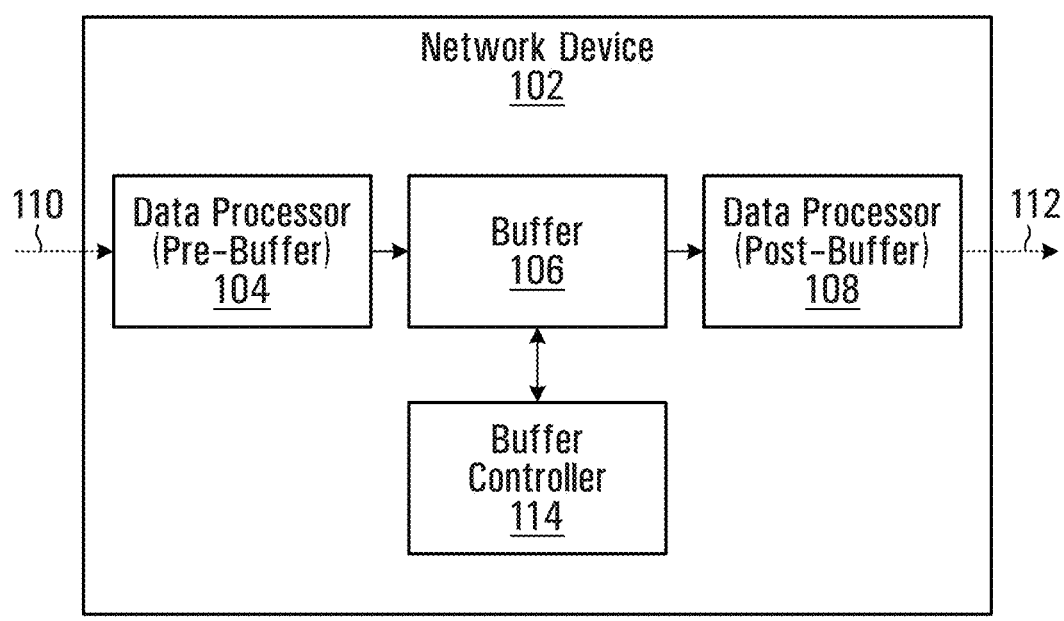
Figure 2:
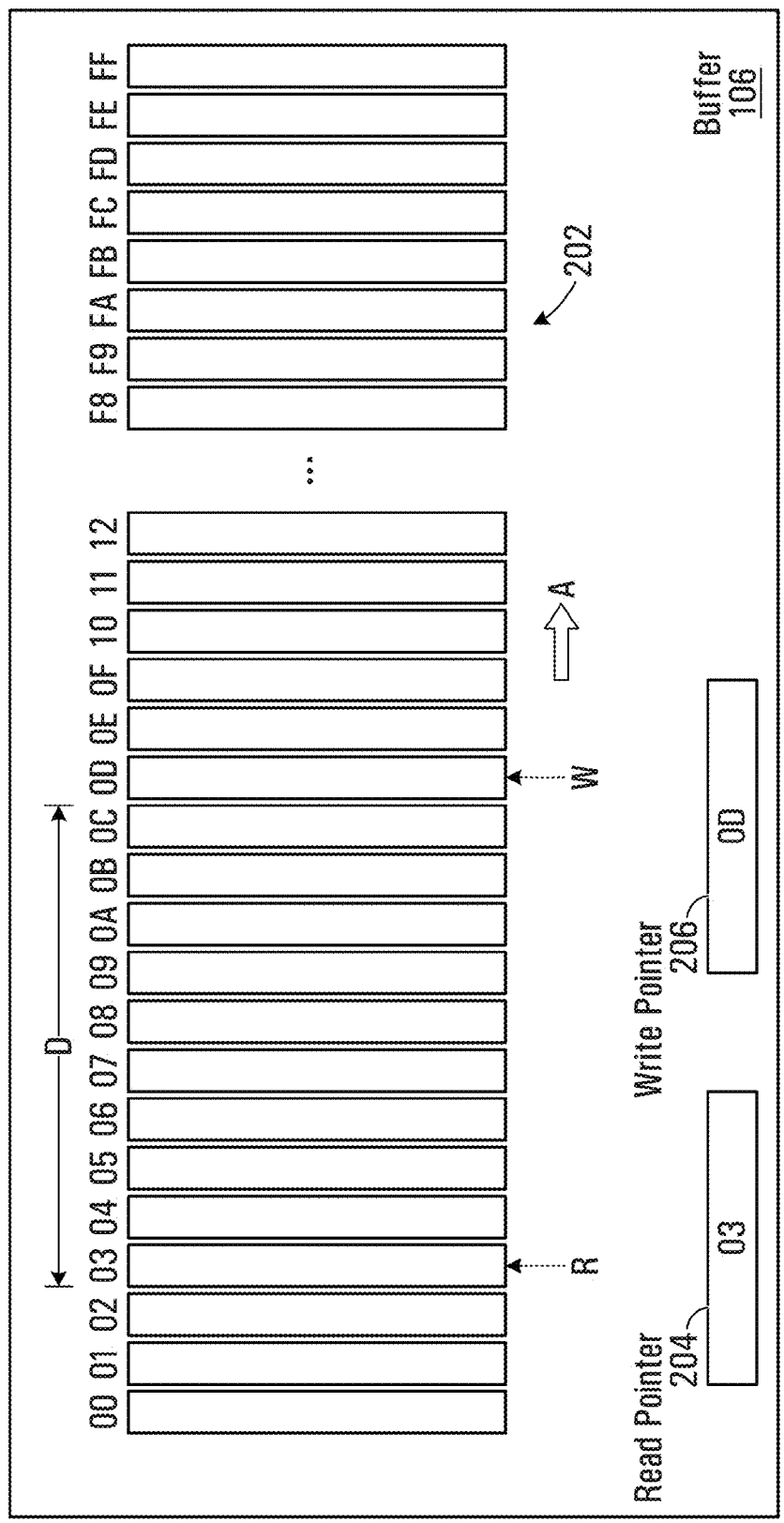
Figure 3:
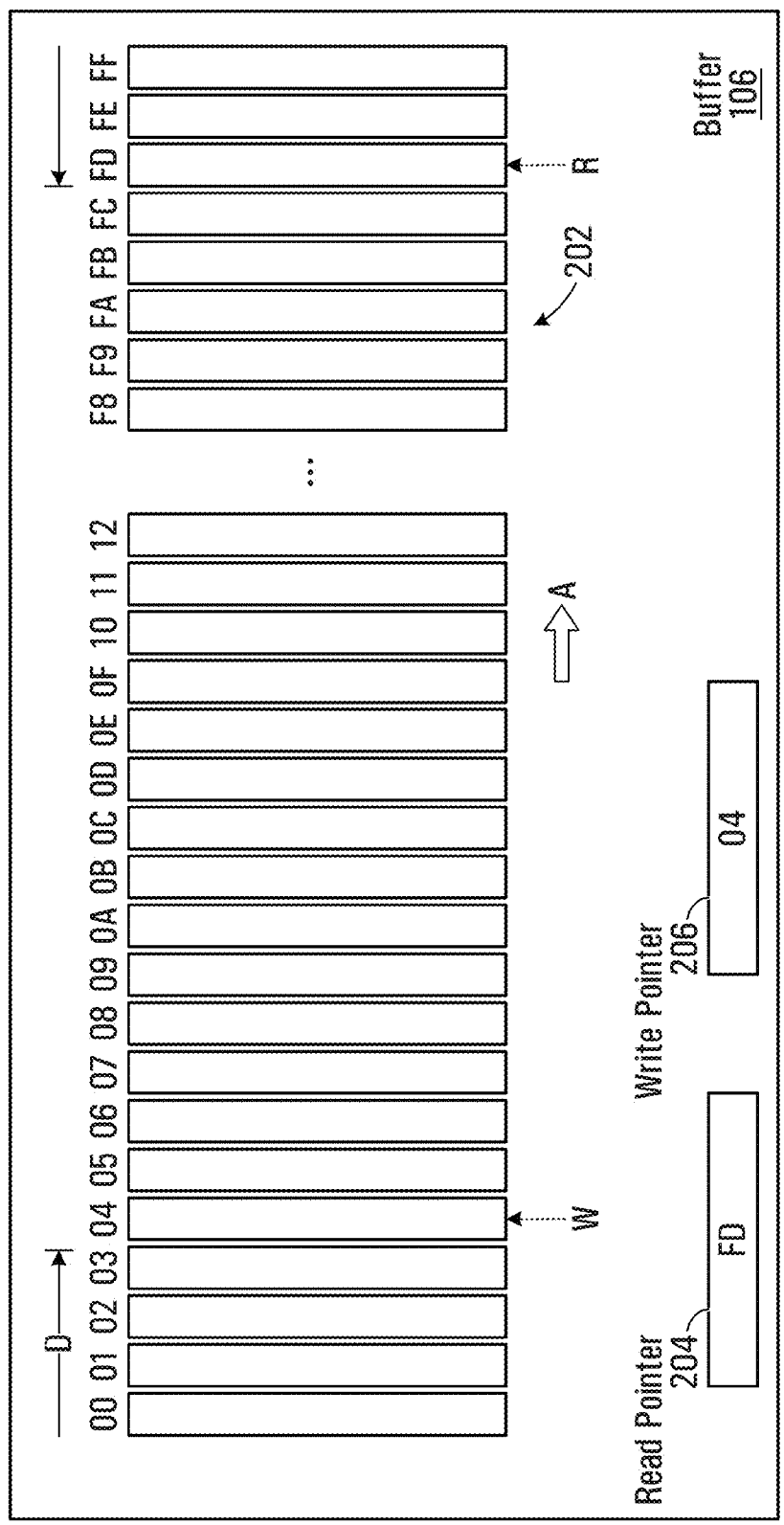
Figure 4:
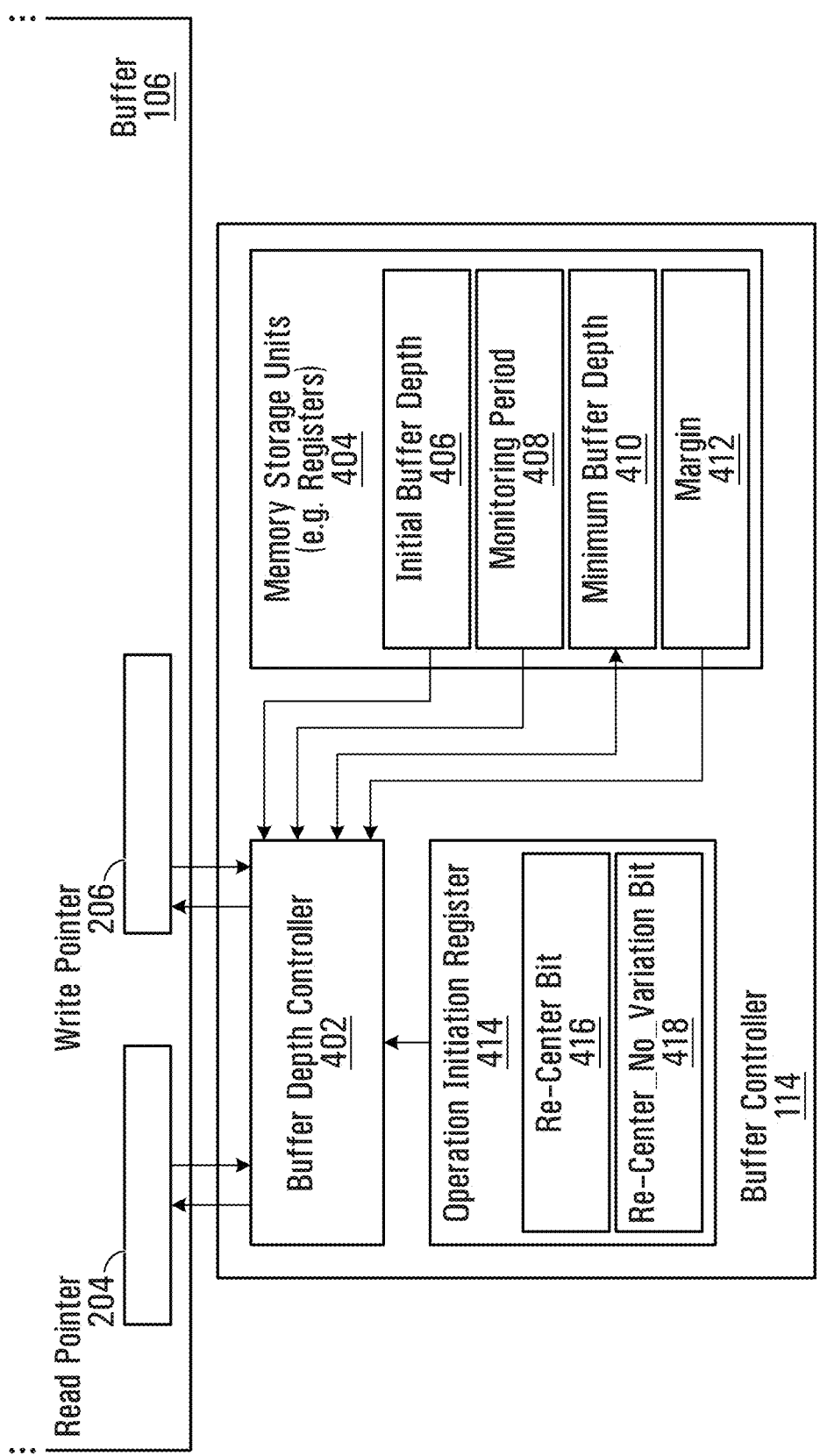
Figure 5:
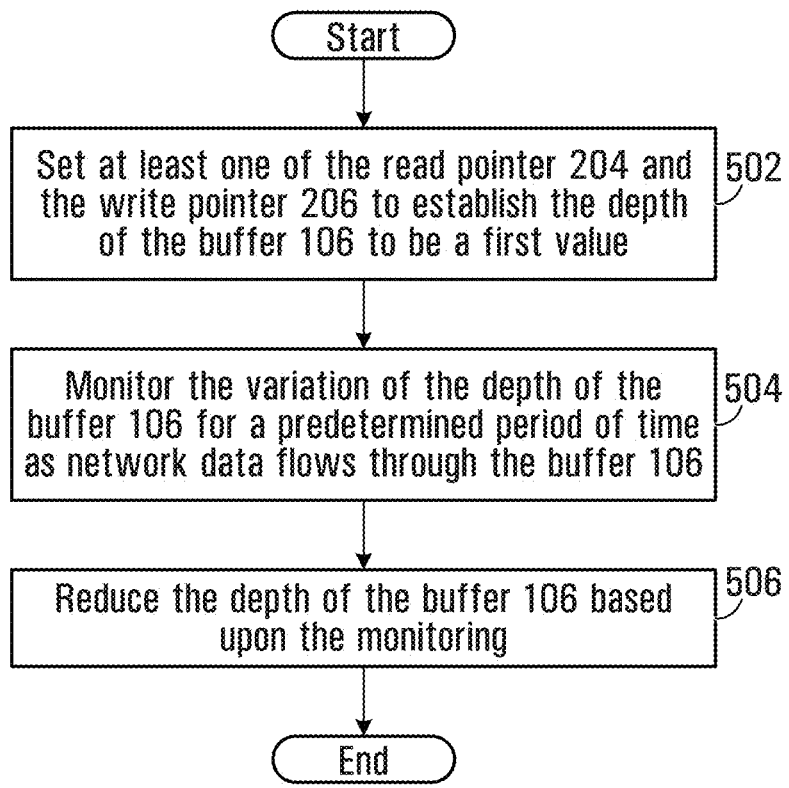
Figure 6:
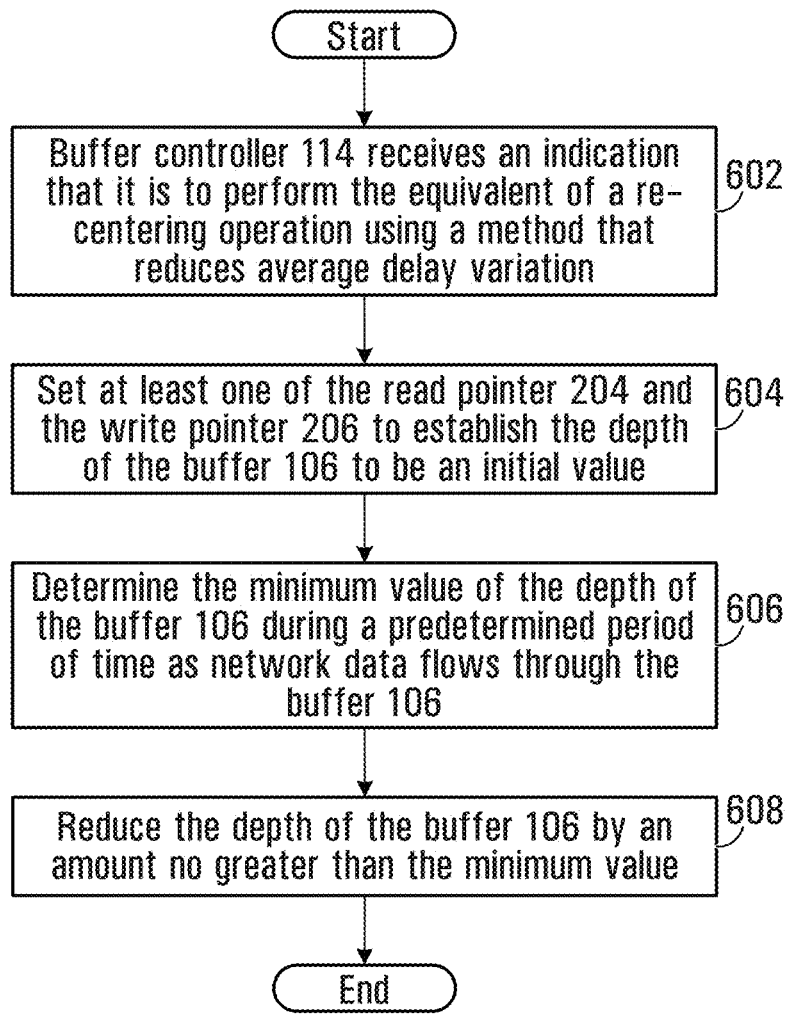
Figure 7:
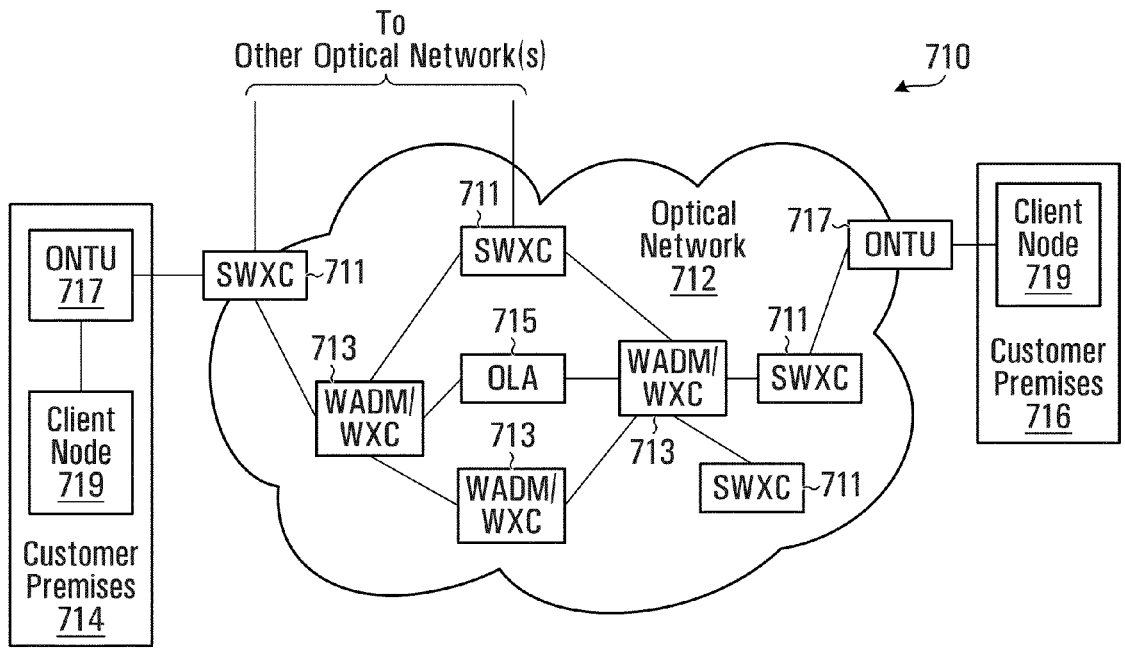
Figure 8:
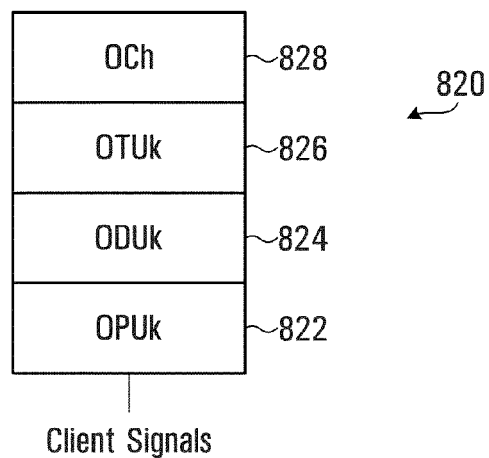
Figure 10:
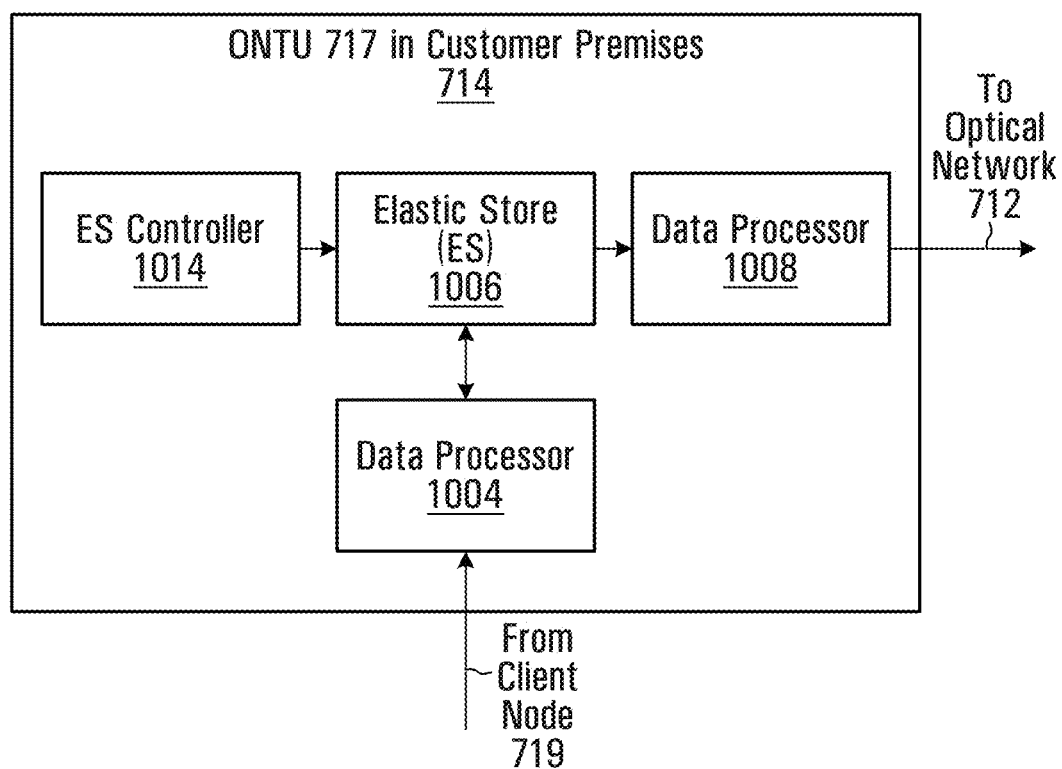
Figure 11:
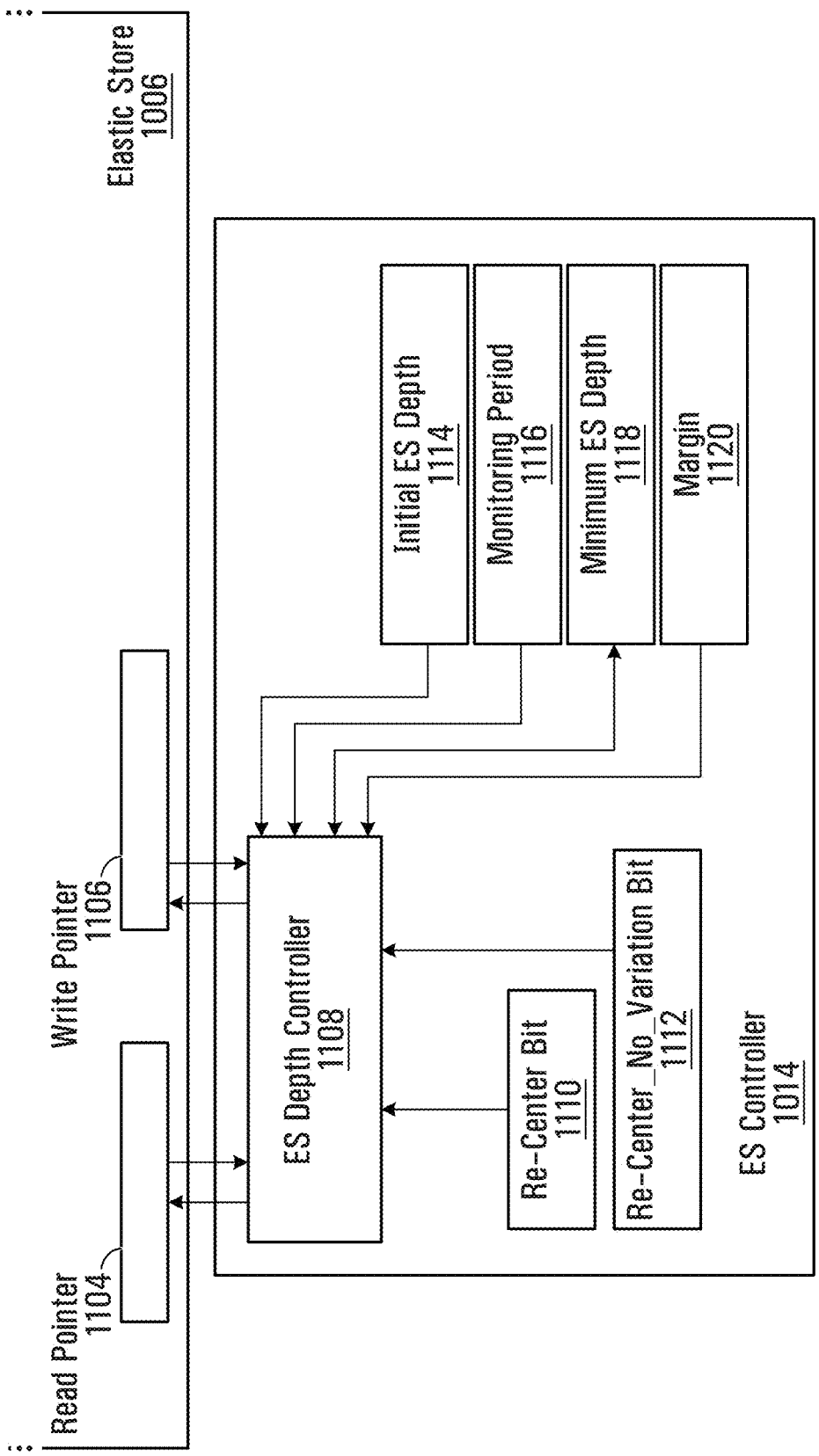
Figure 12:
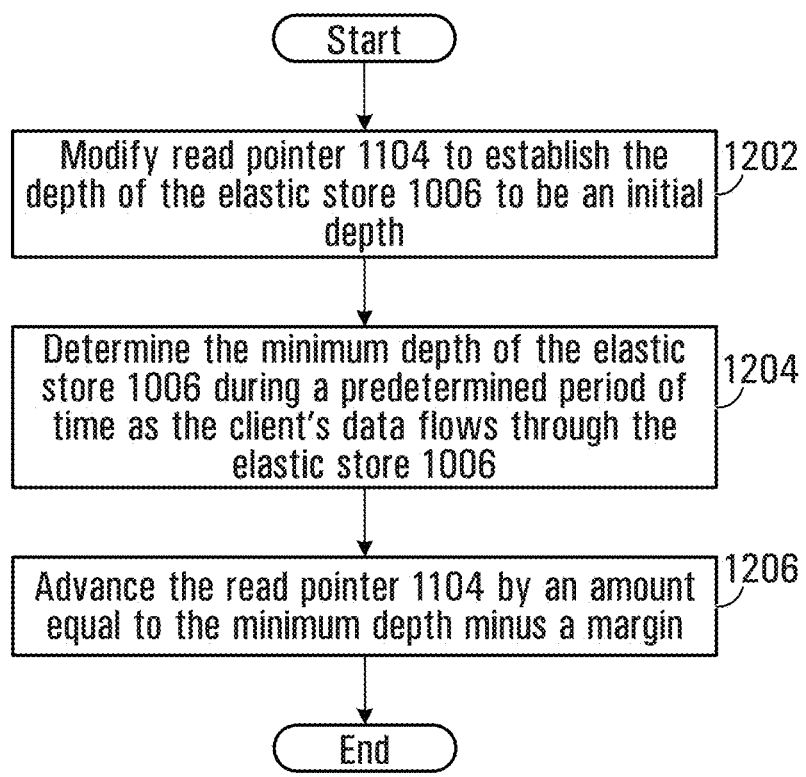

Embodiments of the present application will be described, by way of example only, with reference to the accompanying figures wherein:

FIG. 1 is a block diagram illustrating a network device;
FIG. 2 is a block diagram illustrating a buffer having a first depth;
FIG. 3 is a block diagram illustrating the buffer of FIG. 2 having another depth;
FIG. 4 is a block diagram illustrating a buffer controller;
FIG. 5 is a flow chart of a method of operating a buffer;
FIG. 6 is a flow chart of another method of operating a buffer;
FIG. 7 is a block diagram of an optical communication system;
FIG. 8 is a block diagram of an Optical Transport Network (OTN) signal hierarchy;
FIGS. 9A through 9D form a block diagram of an OTN frame format;
FIG. 10 is block diagram illustrating an OTN Network Termination Unit;
FIG. 11 is block diagram illustrating an elastic store controller; and
FIG. 12 is a flow chart of a method of operating an elastic store.

Like reference numerals are used in different figures to denote similar elements.

DETAILED DESCRIPTION

In general, there are disclosed systems and methods for operating a buffer in a network, such as in an optical network. The buffer is used to temporarily store data that is being communicated between one part of the network and another part of the network. For example, the buffer may be used to buffer Optical Transport Network (OTN) frames, or to buffer data being mapped to or mapped from OTN frames.

The amount of time data is buffered in the buffer represents a delay in the network. It is desired to reduce this average delay, and/or to reduce the variation in the average delay each time the buffer is reset, re-initialized, or re-centered.

In one embodiment, the buffer comprises a plurality of memory entries. Associated with the buffer are a read pointer and a write pointer. The read pointer points to a memory entry from which data is read from the buffer, and the write pointer points to a memory entry in which data is written to the buffer. The buffer has a depth defined as the number of memory entries in the buffer between the memory entry pointed to by the read pointer and the memory entry pointed to by the write pointer. When the buffer is initialized, the depth of the buffer can be set to an initial value, and over time, as more and more analysis of the data traffic characteristics becomes available, the depth can be reduced to help reduce the delay through the buffer.

For example, after the buffer is initialized to have the initial value, the variation of the depth of the buffer may be monitored for a predetermined period of time as network communication data flows through the buffer. The depth of the buffer can then be reduced based upon this monitoring.

In some embodiments, the depth of the buffer is set to an initial depth that is large enough to allow for variation in the depth of the buffer without buffer overflow or buffer underflow, having little or no regard to whether the depth is larger than is required. The variation of the depth is then monitored for a predetermined period of time as network communication data flows through the buffer. Monitoring the variation may comprise tracking and determining the minimum depth of the buffer during the predetermined period of time.

The depth of the buffer may then be reduced by an amount equal to (or at least no greater than) the minimum depth determined during the predetermined period of time. The minimum depth of the buffer determined during the predetermined period of time is representative of the excess amount of buffering (and hence delay) that is not needed. Therefore, reducing the depth of the buffer by this amount, or by an amount no greater than this amount, reduces this excess amount of buffering and therefore reduces the average delay in the buffer.

Determining the minimum depth during the predetermined period of time and then reducing the depth of the buffer by an amount equal to (or no greater than) the minimum depth can also reduce variation in the average delay each time the buffer is re-initialized, reset, or re-centered, assuming the network traffic characteristics are relatively constant. This is because no matter what the initial buffer depth, the depth will always be reduced by an amount equal to (or no greater than) the minimum depth determined during the predetermined period of time, which will result in substantially the same average delay after the depth reduction. Reducing the variation in the average delay each time the buffer is re-initialized, reset, or re-centered provides for more consistent delay characteristics in the network.

Therefore, the method in some embodiments can have the benefit of both reducing the average delay in the buffer, as well as reducing the variation in the average delay in the buffer. This will be explained in more detail below in conjunction with specific embodiments.

For illustrative purposes, embodiments will now be explained in greater detail below in conjunction with the figures.

The embodiments set forth herein represent the necessary information to practice the claimed subject matter and illustrate the best way of practicing such subject matter. Upon reading the following description in light of the accompanying figures, those of sufficient skill will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to computer readable storage medium or media for storage of information, such as computer readable instructions, data structures, program modules, or other data. A non-exhaustive list of examples of computer readable storage media include magnetic cassettes, magnetic tape, magnetic disk storage or other magnetic storage devices, optical disks such as CD-ROM, DVDs, Blu-ray, or other optical storage, volatile and non-volatile, removable and non-removable media implemented in any method or technology, RAM, ROM, EEPROM, flash memory or other memory technology. Any such computer storage media may be part of the device or accessible or connectable thereto. Any application or module herein described may be implemented using computer readable/executable instructions that may be stored or otherwise held by such computer readable storage media.

Referring first to FIG. 1, an embodiment of a network device 102 is illustrated. The network device 102 is part of a network (not shown). For example, the network device 102 may be at the edge of a network (e.g. a termination unit) or may be in the middle of the network (e.g. a conversion or forwarding device). The network device 102 includes a data processor 104, a buffer 106, and another data processor 108. Each one of the data processors 104 and 108 represents one or more processors that process data and execute instructions. Each processor may be a general purpose processor, a specialized processor, or a combination of the two. The buffer 106 may comprise, for example, an addressable piece of physical memory, SRAM, DRAM, a customized ASIC, or one or more general purpose processors.

The data processor 104 writes network communication data to the buffer 104. This data may be, for example, data generated within the network device 102 or data received by the network device 102 at input 110. Input 110 is shown using a stippled line to illustrate that the network communication data written to the buffer 106 may be provided to the network device 102.

The data processor 104 performs pre-buffer data processing. In some embodiments, this involves manipulating the incoming data, for example, to add or remove information such as overhead. In other embodiments, the data processor 104 writes the data to the buffer 106 without manipulating the data.

The data processor 108 reads the network communication data stored in the buffer 106. The data processor 108 may forward the network communication data read from the buffer 106 to the output 112 of the network device 102. Output 112 is shown using a stippled line to illustrate that forwarding the network communication data from the network device 102 is optional.

The data processor 108 performs post-buffer processing. In some embodiments, this involves manipulating the network communication data read from the buffer 106, for example, by adding overhead to the data. For example, in one embodiment, the network communication data read from the buffer 106 is mapped to Optical Transport Network (OTN) frames. In other embodiments, the data processor 108 simply reads the network communication data from the buffer 106 but does not manipulate the data.

Both the data processor 104 and the data processor 108 are illustrated in FIG. 1 for the sake of example. In general, data processing before the buffer 106 and/or after the buffer 106 is optional. That is, in some embodiments, network communication data may be written directly to the buffer 106 without any processing in the device 102, and in other embodiments, network communication data may be read directly from the buffer 106 without any subsequent processing in the device 102.

The buffer 106 is shown in greater detail in FIG. 2. The buffer 106 comprises a plurality of memory entries 202. In the illustrated embodiment, the buffer 106 includes 256 memory entries, labelled incrementally by addresses 00 to FF (hexadecimal). The specific number of memory entries in the illustrated embodiment has been chosen for ease of example. The actual number of memory entries is implementation specific and may be more or less.

The buffer 106 further includes a read pointer 204 and a write pointer 206. The read pointer 204 points to a memory entry from which data is read from the buffer 106, and the write pointer 206 points to a memory entry in which data is written to the buffer 106. As an example, in the illustration in FIG. 2, the read pointer 204 is pointing to memory entry 03 and the write pointer 206 is pointing to memory entry 0D.

In the illustrated embodiment, the read pointer 204 can itself be a location in memory or a physical register that stores the address pointed to by the read pointer 204. Similarly, the write pointer 206 can itself be a location in memory or a physical register that stores the address pointed to by the write pointer 206.

Each time a unit of data is written to the buffer 106, it is written to the memory entry pointed to by the write pointer 206, and the write pointer 206 advances by one memory position. Similarly, each time a unit of data is read from the buffer 106, it is read from the memory entry pointed to by the read pointer 204, and the read pointer 204 advances by one memory position. In this way, the read and write pointers 204 and 206 advance in the direction A illustrated in FIG. 2, as data flows through the buffer 106 by being written to and subsequently read from the buffer 106. The reading and writing operations are typically controlled by a clock (not shown). There may be a separate clock for each pointer, or the same clock may be used for both.

It will be appreciated that the implementation above is just one example of how the read pointer 204 and the write pointer 206 may advance. For example, in other embodiments, the writing of data may occur in the location immediately following the location pointed to by the write pointer 206 at the time the write operation is initiated, and/or the data may be read from the buffer immediately after the location pointed to by the read pointer at the time the read operation is initiated. In any case, the read pointer 204 and the write pointer 206 generally identify the start and end of the portion of the buffer 106 having stored therein data that has been written to the buffer 106 and is waiting to be read from the buffer 106. The data that has been written to the buffer 106 and is waiting to be read from the buffer 106 is referred to as "active" data.

The buffer 106 in the illustrated embodiment is circular, which means that if one of the pointers 204, 206 is pointing to memory position FF, when the pointer is advanced it will return to memory position 00. Thus, during normal operation, the read and write pointers 204 and 206 move in the direction A and wrap around the buffer 106 in a circular manner.

In general, the rate at which the network communication data is written to the buffer 106 during a particular period of time will be different from the rate at which the network communication data is read from the buffer 106 during that same period of time. For example, the network communication data may be written to the buffer 106 at a substantially constant rate, but the network communication data may be read from the buffer 106 in a bursty fashion. Therefore, as network communication data flows through the buffer, the distance between the read and write pointers will vary. However, over the long term, on average the rate at which the network communication data is written to the buffer 106 and the rate at which the network communication data is read from the buffer 106 must converge to be substantially the same in order to avoid constant buffer overflow or buffer underflow. Buffer overflow occurs when the write pointer 206 advances so far ahead of the read pointer 204 that it wraps around and passes the read pointer 204, thereby resulting in new data being written to the buffer 106 on top of data that has not yet been read from the buffer 106. Buffer underflow occurs when the read pointer 204 catches up to and passes the write pointer 206, thereby resulting in data being read from the buffer 106 before it is even written to the buffer 106. In some embodiments, buffer underflow is addressed by preventing the read pointer 204 from passing the write pointer 206. Buffer overflow and buffer underflow are undesirable.

In order to avoid buffer overflow or buffer underflow, the average rate at which the network communication data is written to the buffer 106 and the average rate at which the network communication data is read from the buffer 106 over the long-term should be substantially the same. However, in order to accommodate short-term differences between the rate at which the data is read from the buffer 106 and the rate at which data is written to the buffer 106, buffering is required, and the average distance between the read and write pointers 204 and 206 in buffer 106 should be large enough to avoid temporary buffer overflow or buffer underflow. On the other hand, the amount of time data is stored in the buffer 106 before it is read from the buffer 106 represents a delay in the network device 102, and therefore it is also desired to maintain a relatively small average distance between the read and write pointers 204 and 206.

The depth D of the buffer 106 is defined as the number of memory entries in the buffer 106 between the memory entry pointed to by the read pointer 204 and the memory entry pointed to by the write pointer 206. For example, the depth of the buffer 106 at the instance illustrated in FIG. 2 is D=0D−03=10 (decimal) or 0A (hexadecimal). As another example, in the instance illustrated in FIG. 3, the depth of the buffer 106 is D=04−FD=7 (decimal) or 07 (hexadecimal). It will be appreciated that the depth is measured beginning at the memory entry in the buffer 106 pointed to by read pointer 204 and moving towards the memory entry in the buffer 106 pointed to by the write pointer 206 in a direction in which the read and write pointers 204, 206 move during normal operation (i.e. in the direction A). This depth represents the number of memory entries having stored therein data that has been written to the buffer 106 and is waiting to be read from the buffer 106. As will be appreciated, buffer overflow occurs when the depth of the buffer 106 grows larger than the number of memory entries in the buffer 106 (i.e. when the write pointer 206 passes the read pointer 204), and buffer underflow occurs when the depth of the buffer 106 effectively becomes less than zero when the read pointer 204 passes the write pointer 206.

The amplitude of the depth of the buffer 106 during a given period of time is defined as the maximum depth of the buffer 106 measured during that period of time minus the minimum depth of the buffer measured during that period of time. For example, if the depth of the buffer varies between 25 and 45 (decimal) as data flows through the buffer 106, then the amplitude of the depth of the buffer 106 is 45−25=20 (decimal). The of the depth of the buffer 106 is typically a function of the traffic characteristics of the network communication data flowing through the buffer. The amplitude of the depth is a measure of the span in the variation in the depth.

Referring back to FIG. 1, the network device 102 further includes a buffer controller 114 for operating the buffer. In FIG. 1, the buffer controller 114 is illustrated as a component separate from that of buffer 106. However, in other embodiments the buffer controller 114 can instead be part of the buffer 106 itself.

The buffer controller 114 is shown in greater detail in FIG. 4. The buffer controller 114 includes a buffer depth controller 402 and memory storage units 404. The memory storage units 404 may consist of physical locations in memory or physical registers. Included as part of the memory storage units 404 is an initial buffer depth storage unit 406 for storing a value of an initial buffer depth, a monitoring period storage unit 408 for storing a value of a monitoring period, a minimum buffer depth storage unit 410 for storing a value of a minimum buffer depth tracked during the monitoring period, and a margin storage unit 412 for storing a value of a margin. The use of these values will be described in detail below in relation to the operation of the buffer depth controller 402.

The operation of the buffer depth controller 402 is described in relation to FIG. 5. FIG. 5 illustrates method steps performed by the buffer depth controller 402. It will be appreciated that in some embodiments, instructions for implementing the methods of the buffer depth controller 402 may be stored as code on a computer readable medium, and that the instructions can be executed by the buffer depth controller 402 (or more generally, by one or more processing units in the network device 102). In other embodiments, the buffer depth controller 402 can comprise control logic for performing the methods of the buffer depth controller 402.

Turning therefore to FIG. 5, first in step 502 the buffer depth controller 402 sets at least one of the read pointer 204 and the write pointer 206 of the buffer 106 to establish the depth of the buffer 106 to be a first value. In the illustrated embodiment, this first value is the value stored in the initial buffer depth storage unit 406. For example, the value stored in the initial buffer depth storage unit 406 may be 128, which is half the size of the buffer 106. The buffer depth controller 402 therefore modifies at least one of the read pointer 204 and the write pointer 206 to set the buffer to be this initial depth of 128. For example, the buffer depth controller 402 may modify the value of the read pointer 204 to be 128 memory positions or entries behind the current value of the write pointer. In some embodiments, the value stored in the initial buffer depth storage unit 406 is controllable by a user by setting the value of the initial buffer depth storage unit 406.

Next, in step 504, the buffer depth controller 402 monitors the variation of the depth of the buffer 106 for a predetermined period of time as network communication data flows through the buffer 106, being written to and subsequently read from the buffer 106. This predetermined period of time is referred to as the monitoring period. As explained earlier, as network communication data flows through the buffer 106, the distance between the read and write pointers 204 and 206 (and hence the depth of the buffer 106) varies. This variation is monitored in step 504 for the duration of the monitoring period. In the illustrated embodiment, the length of the monitoring period is equal to the value stored in the monitoring period storage unit 408. In some embodiments, the value stored in the monitoring period storage unit 408 is controllable by a user by setting the value of the monitoring period storage unit 408.

Finally, in step 506, after the monitoring period has expired, the buffer depth controller 402 reduces the depth of the buffer 106 based upon the monitoring in step 504.

Using the method of FIG. 5, the depth of the buffer 106 can initially be set (in step 502) to a depth that is large enough to avoid buffer overflow or buffer underflow, having little or no regard to whether the depth is larger than is required. For example, in some embodiments, the initial depth of the buffer 106 can be set to half the size of the buffer 106, which may be much larger than is required to prevent buffer overflow or buffer underflow, but results in an equidistant position between the read and write pointers 204 and 206 in both directions, thereby substantially eliminating the risk of buffer overflow or buffer underflow. This comes at the cost of increased delay due to data being stored in the buffer 106 longer than is required.

As the network communication data flows through the buffer 106 by being written to the buffer 106 and subsequently read from the buffer 106, the variation of the depth of the buffer 106 is monitored for a predetermined period of time (step 504). The monitored variation can reveal if the buffer depth is larger than it needs to be for the traffic characteristics of the network communication data, and if so, by how much. For example, if during the monitoring period the depth of the buffer 106 never falls below 50 memory entries, then the depth of the buffer is 50 memory entries larger than is necessary for the monitored network data traffic characteristics. The depth of the buffer 106 can then be reduced (in step 506) based on the monitoring, for example, by the 50 memory entries. Assuming the traffic characteristics do not change, the average delay in the buffer 106 going forward will therefore be reduced while still avoiding buffer overflow and buffer underflow. This assumes, of course, that the monitored variation of the depth of the buffer in step 504 captures the maximum amount of variation of the depth of the buffer 106 for the network traffic. As will be discussed in more detail below, in some embodiments the depth of the buffer can be reduced in step 506 by an amount equal to the minimum depth measured in step 504 minus a margin, in order to allow for the depth of the buffer 106 to vary more than the variation captured during step 504.

Therefore, a benefit of the method of FIG. 5 can be that the optimal average depth of the buffer 106 need not be determined and programmed in advance. Rather, an initial larger depth can be established (step 502), and the depth subsequently reduced (in step 506) after monitoring the behaviour of the network traffic characteristics and its effect on the depth of the buffer 106 (in step 504).

A possible drawback of the method of FIG. 5 is that reducing the depth of the buffer 106 in step 506 will typically result in network communication data being lost. For example, if the depth of the buffer 106 is reduced by advancing the read pointer ahead by 50 memory positions, then the data previously written to the buffer 106 and stored in those 50 memory positions over which the read pointer jumped will not be read from the buffer 106. However, the inventors have recognized that in certain applications, such as in Optical Networks, the loss of some network communication data is acceptable during this initial period of time, and is offset by the benefit of a buffer with a reduced average depth subsequent to step 506 of the method.

Example ways of monitoring the variation (step 504) and reducing the depth of the buffer based upon the monitoring (step 506) are explained below.

In a first example embodiment, during step 504, the depth of the buffer 106 is monitored by the buffer depth controller 402 by tracking and determining the minimum buffer depth during the monitored period. This minimum buffer depth is stored in the minimum buffer depth storage unit 410. Tracking and determining the minimum buffer depth during the monitored period can be achieved as follows:

(1) Immediately prior to performing step 504, the value of the minimum buffer depth storage unit 410 is set to be a large value, such as the largest value possible.

(2) At every clock cycle during the monitoring period, or alternatively, each time the read pointer 204 or write pointer 206 is advanced during the monitoring period, the depth of the buffer 106 is calculated by the buffer depth controller 402. The depth can be calculated, for example, by subtracting the memory address of the memory entry pointed to by the read pointer from the memory address of the memory entry pointed to by the write pointer (taking into account rollover at the end of the memory as necessary, such as in FIG. 3).

(3) The buffer depth calculated in step (2) is then compared to the value stored in the minimum buffer depth storage unit 410.

(4) If and only if the buffer depth calculated in step (2) is less than the value stored in the minimum buffer depth storage unit 410, then the value of the minimum buffer depth storage unit 410 is replaced with the buffer depth calculated in step (2).

In this way, by performing steps (1) to (4) above, at the end of the monitoring period the minimum depth of the buffer 106 calculated during the monitoring period will be stored in the minimum buffer depth storage unit 410.

If at the end of step 504 the minimum buffer depth stored in the storage unit 410 is greater than zero, this indicates that the monitored network traffic characteristics are such that the buffer 106 has a depth greater than is necessary to prevent buffer underflow. Therefore, in step 506, the depth of the buffer 106 is reduced by an amount no greater than the value stored in the minimum buffer depth storage unit 410.

For example, if at the end of step 504 the minimum buffer depth stored in the storage unit 410 is 50 (decimal), this indicates that during the monitoring period the depth of the buffer 106 never dropped below 50, which means that the monitored network traffic characteristics are such that the buffer 106 has a depth that is 50 memory entries greater than necessary. Therefore, in step 506, the depth of the buffer 106 can be reduced by 50 by advancing the read pointer 204 ahead by 50 memory entries. If the buffer is reduced by more than 50 entries, then buffer underflow will occur.

The duration of the monitoring period in step 504 is implementation specific, but is typically long enough to capture the full variation (or at least a substantial portion of the variation)

in the depth of the buffer 106 that occurs due to the network traffic characteristics of the network communication data flowing through the buffer 106. For example, in applications in which there is mapping or demapping of payload data to network transport frames, the network data traffic characteristics typically exhibit a repeatable pattern during which the depth of the buffer 106 will vary by a maximum amount and then repeat itself. This pattern is typically a function of the framing cycle. Thus, in some embodiments, the duration of the monitoring period is a function of the packets or frames being transmitted. As a specific example, in an OTN, the duration of the monitoring period may be the duration of one or more rows of an OTN frame, or the duration of one or more OTN frames. As another specific example, in Synchronous Optical Networking (SONET), the duration of the monitoring period may be the duration of a portion of a SONET frame, a whole SONET frame, or several SONET frames.

As mentioned earlier, the amplitude of the depth of the buffer 106 during a given period of time is a measure of the span of the variation of the depth during that period of time. This amplitude is representative of the traffic characteristics of the network communication data flowing through the buffer 106. In order to allow the amplitude of the depth of the buffer 106 to be greater than during step 504, while still preventing buffer underflow, in step 506 the buffer depth controller 402 can reduce the depth of the buffer 106 by an amount equal to the minimum buffer depth determined during the monitoring period minus a margin. For example, keeping with the example mentioned earlier, if the minimum depth of the buffer 106 determined during the monitoring period is 50, then assuming the margin is 10, in step 506 the buffer depth controller 402 will reduce the depth of the buffer 106 by 40 (50−10). This means that the depth of the buffer 106 subsequent to step 506 will always be 10 memory entries larger than it needs to be as determined by the monitored traffic characteristics in step 504. The extra 10 memory entries (i.e. the margin) allows for the amplitude of the depth of the buffer 106 to be up to 10 memory entries larger than the amplitude during the monitoring period (step 504), without buffer underflow.

Thus, the value of the margin represents a trade-off between minimizing the average delay in the buffer 106 during operation subsequent to step 506, and allowing for the span of the variation of the depth of the buffer 106 to be larger than during the monitoring period whilst still avoiding buffer overflow and buffer underflow. The larger the margin, the greater the average delay of the network communication data in the buffer 106, but the less likely buffer underflow will temporarily occur if the span of the variation of the depth of the buffer 106 becomes larger than during the monitoring period. A margin of zero minimizes the average delay of network communication data in the buffer 106 during operation subsequent to step 506, but a non-zero margin offers protection against temporary buffer underflow if during operation subsequent to step 506 the span of the variation of the depth of the buffer 106 becomes larger than that measured during the monitoring period in step 504.

The exact value of the margin is implementation specific and can correspond to an acceptable window for allowing the depth of the buffer 106 to vary more than during the monitoring period in step 504. In some embodiments, the margin can be controlled by a user by setting the value of the margin in the margin storage unit 412. A few examples of how the margin may be selected include selecting the margin based on the amplitude of the depth (e.g. a percentage of the depth), the type or characteristics of the traffic flowing through the buffer 106, a margin previously used, and/or the minimum depth or depth amplitude previously determined.

The example embodiments described above implement the more general steps 504 and 506 by specifically determining the minimum depth of the buffer 106 during the monitoring period (step 504) and then reducing the depth of the buffer 106 by an amount no greater than the minimum depth of the buffer 106 determined during the monitoring period (step 506). By performing such a method, it can also be possible to reduce the variation in the average delay in the buffer 106 over the equivalent of several re-centering operations of the buffer 106. This is explained in more detail below.

Re-centering of the buffer 106 refers to resetting or re-initializing the depth of the buffer to be a predetermined value, and is typically performed by moving one or both of the read and write pointers to establish the predetermined depth. Examples of situations in which re-centering may be triggered are: resetting the buffer 106 upon powering up of the network equipment; during network link failure recovery; upon setting up a new network path; and/or in a situation in which there becomes an imbalance in the input and output rates of data written to/read from the buffer 106. The imbalance may be determined, for example, based on the amount of variation of the input and output rates, an occurrence or near-occurrence of a buffer underflow or buffer overflow, and/or an indication from a higher-level application layer. In some embodiments, the imbalance may be detected by a higher layer.

In the illustrated embodiment, the buffer controller 114 includes an operation initiation register 414, which includes a 're-center' bit 416 that can be toggled to perform the re-centering operation described above.

However, in some applications, such as in the mapping and demapping of payloads to OTN transport packets in OTN, the cycle controlling when data is read from the buffer 106 or written to the buffer 106 is independent of when the buffer 106 is re-centered. Therefore, it could be the case that the first time the buffer 106 is re-centered the OTN cycle may be such that a burst of data is about to be read from the buffer 106. As a result, the read pointer 204 will burst ahead shortly after the buffer 106 is re-centered, resulting in a relatively smaller average delay in the buffer 106 going forward. For example, if the depth of the buffer 106 is set as D when the buffer 106 is re-centered, and a burst of data is immediately read from the buffer 106 upon re-centering, thereby reducing the depth of the buffer 106 by d, then the depth of the buffer 106 may fluctuate over time between D and D-d. However, next time the buffer 106 is re-centered, it could be the case that the OTN cycle is such that a burst of network communication data just finished being transmitted and no more data is to be read from the buffer 106 until later in the OTN cycle. In this case, the depth of the buffer 106 is set as D when the buffer 106 is re-centered, and will grow by e before more data is read from the buffer 106, which means that going forward the depth of the buffer 106 may fluctuate over time between D and D+e. Thus, the first time the buffer 106 is re-centered the average delay is somewhere between D and D-d, whereas the next time the buffer 106 is re-centered the average delay is somewhere between D and D+e. This variation in the average delay each time the buffer 106 is re-centered is undesirable.

This problem can be addressed by having the buffer controller 114 perform the method of FIG. 6 in lieu of a re-centering operation. The method of FIG. 6 is described below, and it illustrates method steps that are performed by the buffer controller 114. It will be appreciated that in some embodiments, instructions for implementing the method may be stored as code on a computer readable medium, and that the instructions can be executed by the buffer controller 114 (or more generally, by one or more processing units in the network device 102). In other embodiments, the buffer controller 114 can comprise control logic for performing the method.

First, in step 602, the buffer controller 114 receives an indication that it is to perform the equivalent of a re-centering operation, but using a method that reduces delay variation. In the illustrated embodiment this is achieved as follows: the operation initiation register 414 includes a 're-centering_no_variation' bit 418, and this bit can be toggled, for example by a user, to provide the indication. The user may, for example, toggle the bit via a software register or via an input pin of an integrated circuit chip in which the buffer controller 114 is implemented.

Then, in step 604, in response to the toggling of the 're-centering_no_variation' bit 418, the buffer depth controller 402 sets at least one of the read pointer 204 and the write pointer 206 to establish the depth of the buffer 106 to be an initial value equal to the value stored in the initial buffer depth storage unit 406. This initial buffer depth value is large enough to avoid buffer overflow or buffer underflow, and is chosen having little or no regard to whether the buffer depth is larger than is required for the network traffic. For example, in some embodiments, the initial depth of the buffer 106 can be set to half the size of the buffer 106. It will be noted that step 604 is an example implementation of the more general step 502 of FIG. 5.

Next, in step 606, the buffer depth controller 402 tracks the minimum depth of the buffer 106 during a predetermined period of time as network communication data flows through the buffer 106, in order to determine the minimum value of the depth of the buffer 106 during this predetermined period of time. The duration of the predetermined period of time is equal to the monitoring period value stored in the monitoring period storage unit 408. The minimum depth determined in step 606 is stored in the minimum buffer depth storage unit 410. Note that step 606 is an example implementation of the more general step 504 of FIG. 5.

Finally, in step 608, after the monitoring period of step 606 has expired, the buffer depth controller 402 reduces the depth of the buffer 106 by an amount no greater than the minimum buffer depth determined in step 606. For example, in one embodiment, the depth of the buffer 106 is reduced by an amount equal to the value stored in the minimum buffer depth storage unit 410 minus a margin. Note that step 608 is an example implementation of the more general step 506 of FIG. 5.

In this way, by performing the method of FIG. 6, the equivalent of a re-centering operation will occur, but in a way that reduces the variation in the average delay across multiple executions of the method of FIG. 6 (i.e. across the equivalent of multiple re-centering operations), assuming the network traffic characteristics do not change substantially over the course of the multiple executions of the method. For example, assuming the network device 102 is part of an OTN, then the average delay of the OTN data flowing through the buffer 106 will be the same subsequent to step 608, regardless of the location in the OTN cycle when the method of FIG. 6 is initiated. A simple example demonstrating this is described below for better understanding.

Assume that the first time the method of FIG. 6 is performed, the initial depth of the buffer in step 604 is set to 128 (decimal). The variation of the depth is then monitored in step 606. Assume for the sake of example that the depth varies during this period between 72 and 136. Therefore, the minimum depth of the buffer determined in step 606 is 72. The amplitude of the depth during this period is 136−72=64. Now, assume that in step 608 the depth of the buffer is reduced by an amount equal to the minimum depth determined in step 606, which in this case is 72. Therefore, during operation subsequent to step 608, as network communication data flows through the buffer 106, the depth of the buffer 106 will vary between 0 and 64 (the same span of variation as previously monitored in step 606, but at a lower depth due to reducing the depth by 72).

Now assume that the method of FIG. 6 is performed again at a later time in lieu of a re-centering operation, for example, if the buffer 106 is to be reset. In step 604 the depth of the buffer 106 is again initially set to 128. The variation of the depth is then monitored in step 606. Assume for the sake of example that this time the depth varies between 116 and 180, due to the fact that a network framing cycle is at a different stage than the first time the method of FIG. 6 is initiated. Therefore, the minimum depth of the buffer determined in step 606 is 116. The amplitude of the depth during this period is still 64 (180−16) since the characteristics of the network data and their effect on the buffer variation have not changed. In step 608, the depth of the buffer is reduced by an amount equal to the minimum depth determined in step 606, which in this case is 116. Therefore, going forward subsequent to step 608, the depth of the buffer will again vary between 0 and 64 (the same span of variation as previously monitored in step 606, but at a lower depth due to reducing the depth by 116).

Thus, assuming the network traffic characteristics do not change between the first time the method of FIG. 6 is performed and the next time the method of FIG. 6 is performed, the average delay of the network data in the buffer 106 will always be the same subsequent to step 608, or equivalently, the buffer depth will always end up varying between 0 and 64, regardless of the varying initial average delay in the buffer due to the framing cycle.

It will be appreciated that the example above is purposely simple for ease of illustration.

Performing the method of FIG. 6 may result in some network communication data being lost when the buffer depth is reduced in step 608. However, this is acceptable in some network applications. Additionally, some network applications are designed to accommodate such temporary losses of data, particularly during transitional or initialization periods. In some network applications, the loss of some data is expected and is handled by a higher network layer. Moreover, the disadvantage of a potential loss of data in the method of FIG. 6 is offset by the benefit of reducing the variation in the average delay across multiple executions of the method of FIG. 6 (i.e., across what is the equivalent of multiple re-centering operations).

The use of a separate 're-center' bit 416 and 're-centering_no_variation' bit 418 in the illustrated embodiment is for example purposes only. In alternative embodiments, the method of FIG. 6 can instead be performed automatically each time re-centering is required.

The example embodiments described above implement steps 504 and 506 of the method of FIG. 5 by determining the minimum depth of the buffer 106 during the monitoring period (step 504) and then reducing the depth of the buffer 106 by an amount no greater than the minimum depth of the buffer 106 determined during the monitoring period (step 506). In other embodiments, steps 504 and 506 of the method of FIG. 5 can instead be implemented other ways.

For example, in some embodiments, the average depth (instead of the minimum depth) of the buffer 106 may be determined during the monitoring period in step 504, and the depth of the buffer 106 may be reduced in step 506 by an amount equal to this average depth minus a suitably sized margin value to protect against temporary buffer underflow during operation subsequent to step 506. The average depth during the monitoring period may be calculated by computing the sum of each depth of the buffer measured each time a read or write pointer advances during the monitoring period, and then dividing by the number of times a pointer is advanced.

In other embodiments, the step of monitoring the depth of the buffer 106 in step 504 can include or instead involve tracking and determining the maximum depth of the buffer 106 during the monitoring period. In one embodiment, tracking and determining the maximum depth of the buffer 106 during the monitoring period is achieved as follows:

(1) Immediately prior to performing step 504, a register for holding the maximum buffer depth (not shown) is set to be a small value, such as the smallest value possible.

(2) At every clock cycle during the monitoring period, or alternatively, each time the read pointer 204 or write pointer 206 is advanced during the monitoring period, the depth of the buffer 106 is calculated. The depth can be calculated, for example, by subtracting the memory address of the memory entry pointed to by the read pointer from the memory address of the memory entry pointed to by the write pointer (taking into account rollover at the end of the memory as necessary, such as in FIG. 3).

(3) The buffer depth calculated in step (2) is then compared to the value stored in the maximum buffer depth register.

(4) If and only if the buffer depth calculated in step (2) is greater than the value stored in the maximum buffer depth register, then the value of the maximum buffer depth register is replaced with the buffer depth calculated in step (2).

In this way, by performing steps (1) to (4) above, at the end of the monitoring period the maximum depth of the buffer 106 calculated during the monitoring period will be stored in the maximum buffer depth register. If the minimum depth of the buffer 106 is also tracked during step 504, then the amplitude of the depth of the buffer 106 can be computed by subtracting the minimum depth from the maximum depth.

The following are two example scenarios in which tracking the maximum depth of the buffer 106 during the monitoring period may be useful. (i) In some embodiments, the maximum depth of the buffer 106 determined during the monitoring period is recorded and is also reduced in step 608, but by an amount equal to the minimum value of the depth determined in step 606 (perhaps minus a margin). This is then set as an upper threshold for the depth of the buffer 106. In operation subsequent to step 608, if the depth of the buffer 106 grows beyond this upper threshold, it indicates abnormal buffer growth relative to that tracked during the monitoring period, which can be an indication of a problem. (ii) In some embodiments, the amplitude of the depth of the buffer 106 may be approximately known in advance. Therefore, the maximum depth of the buffer could instead be tracked during the monitoring period in step 606, and the depth of the buffer 106 subsequently reduced in step 608 by an amount no greater than the maximum depth minus the amplitude.

A few specific example implementations will now be described in detail below in the specific context of an Optical Transport Network (OTN). However, as is clear from the above, the methods described above are not limited to OTN applications.

Turning therefore to FIG. 7, there is shown a block diagram of an example optical communication system 710, which includes an optical network 712 and customer premises 714, 716, which in turn include different types of OTN equipment. At the customer premises 714, 716, there are client nodes 719, and the customer premises 714 also include an OTN Network Termination Unit (ONTU) 717. Within the optical network 712, there are ONTUs 717, Wavelength Add Drop Multiplexers/Cross Connects (WADM/WXC) 713, Subwavelength Cross Connects (SWXCs) 711, and Optical Line Amplifiers (OLAs) 715.

OTN networks, equipment, and their operation are described, for example, in the International Telecommunication Union (ITU) Recommendation G.798.1, entitled "Types And Characteristics Of Optical Transport Network (OTN) Equipment".

FIG. 8 is a block diagram of an OTN signal hierarchy. This signal hierarchy 820 includes the OPUk signal 822, which is a signal that encapsulates client signals and handles any rate justification. The Optical channel Data Unit (ODUk) signal 824 carries the OPUk signal 822 and supports additional functions such as monitoring and protection switching. The Optical channel Transport Unit (OTUk) signal 826 adds Forward Error Correction (FEC) coding and further monitoring functions. The OPUk signal 822, the ODUk signal 824, and the OTUk signal 826 are all in the electrical domain. The Optical Channel (OCh) signal 828 is in the optical domain, and is a result of converting the OTUk signal 826 to optical form. Although not explicitly shown in FIG. 8, OPUk signals 826 could be multiplexed into Optical channel Transport Lane (OTL) signals instead of OCh signals.

Figures 9C, 9D:
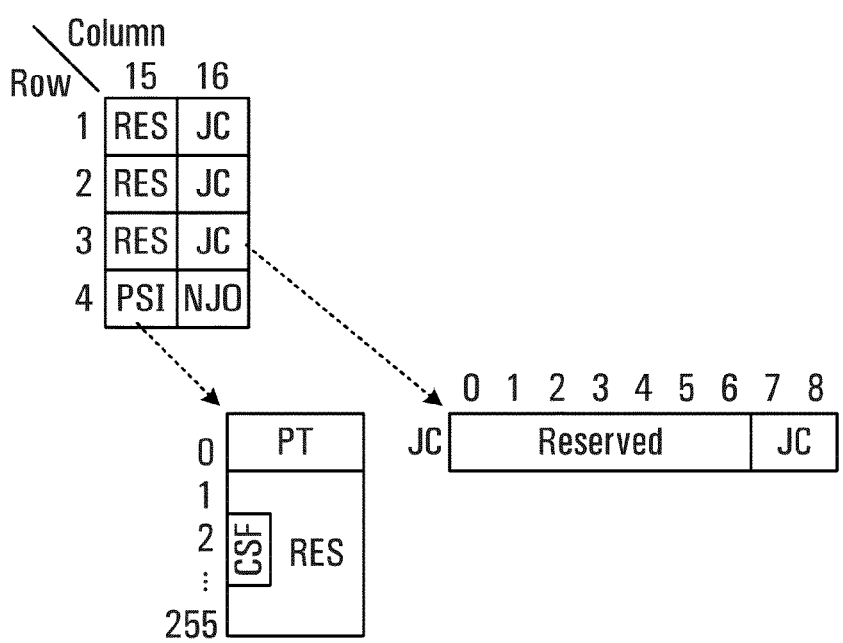

FIGS. 9A through 9D form a block diagram of an OTN frame format, and illustrate the electrical domain signals shown in FIG. 8 in more detail. The OTN frame format is an OTUk frame, which includes 4 rows of 4080 byte-wide columns, as shown in FIG. 9A. The first 14 columns of row 1 are frame alignment overhead (FA OH), the first 14 columns of rows 2 through 4 are ODUk OH, columns 15 and 16 are OPUk OH, the next 3808 columns (columns 17 through 3824) are an OPUk payload area, and the final 256 columns carry OTUk FEC codes.

Details of the various OH sections are shown in FIGS. 9B through 9D. The OH fields are as follows, for the FA OH and the OTUk OH (FIG. 9B):

FAS—Frame Alignment Signal
GCC—General Communication Channel
MFAS—Multi Frame Alignment Signal
RES—Reserved for future international standardization
SM—Section Monitoring,
for the ODUk OH (FIG. 9C):
PM—Path Monitoring
TCM—Tandem Connection Monitoring
PM & TCM—Path Monitoring & Tandem Connection Monitoring
RES—Reserved for future international standardisation
ACT—Activation/deactivation control channel
FTFL—Fault Type & Fault Location reporting channel
EXP—Experimental
GCC—General Communication Channel
APS—Automatic Protection Switching coordination channel
PCC—Protection Communication Control channel,
and for the OPUk OH (FIG. 9D):
RES—reserved for future international standardization
PSI—Payload Structure Identifier
PT—Payload Type
CSF—Client Signal Fail
JC—Justification Control
NJO—Negative Justification Opportunity.

The manner in which client signals are encapsulated into OPUk signals, as well as the generation of the ODUk and OTUk signals, is defined in detail in the ITU Recommendation G.709/Y.1331, entitled "Interfaces for the Optical Transport Network (OTN)". G.709 also provides additional details regarding signal formats.

Returning to FIG. 7, each of ONTU 717 and WADM/WXC 713 includes a buffer, such as buffer 106.

The ONTU 717 in customer premises 714 is shown in greater detail in FIG. 10. The purpose of this ONTU 717 is to convert the client's data into OTN frames for transmission over the optical network 712.

The ONTU 717 includes a data processor 1004 for receiving client network communication data from client node 719, removing overhead associated with the client data, and writing the payloads of the client data to an elastic store 1006. For example, the network communication data from the client may be SONET data, in which case the data processor 1004 may strip the SONET-specific overhead from the SONET data and write the payloads to the elastic store 1006. The elastic store 1006 is a circular buffer and is an example of the buffer 106 described in detail in relation to FIGS. 1-4.

The ONTU 717 further includes a data processor 1008 for reading client data from the elastic store 1006, mapping this data to OTN frames, and transporting these OTN frames into the optical network 712. Specifically, in each framing cycle, the data processor 1008 reads an amount of data from the elastic store 1006 equivalent to the size of an OTN payload. The data processor 1008 then encapsulates this data to generate the OPUk signal 822, and then generates the ODUk signal 824 to carry the OPUk signal 822. The data processor 1008 then adds FEC and creates the OTUk 826. This OTUk 826 is then converted into the optical domain and transmitted into the optical network 712. This process is repeated for each OTN framing cycle.

The rate at which network communication data from the client is written to the elastic store 1006 is dependent upon the rate at which this data is received from the client node 719. For example, the client node 719 may provide Ethernet data at a relatively constant rate of 40 Gigabits per second (Gbps). The rate at which data is read from the elastic store 1006 and mapped to OTN frames is dependent upon the OTN framing cycle. On average, over the long-term, the rate at which data is written to the elastic store 1006 and the rate at which data is read from the elastic store 1006 must be the same in order to avoid constant buffer overflow or buffer underflow. However, the provision of the elastic store 1006 allows for buffering of the client data over the short term since the rate at which the data is provided by the client and the rate at which the data is accepted from the client and mapped to OTN frames may be different over short periods of time. For example, the client data may be provided at a relatively constant rate and therefore written to the elastic store 1006 at a relatively constant rate. However, the data processor 1008 may read the data from the elastic store 1006 in a bursty fashion. Specifically, due to the transmission of the FEC and other overhead associated with each OTN frame, the data processor 1008 will typically read data from the elastic store 1006 in bursts interspersed by periods of time when no data is read from the elastic store 1006 when the overhead associated with the OTN frame is being transmitted over the optical network 712.

The ONTU 717 further includes an elastic store (ES) controller 1014, which is an example of the buffer controller 114 of FIG. 1. The elastic store 1006 and the ES controller 1014 are shown in greater detail in FIG. 11

The elastic store 1006 includes a read pointer 1104 and a write pointer 1106, which operate in the same manner as described earlier in relation to the buffer 106. The value of these read and write pointers 1104 and 1106 are modifiable by the ES depth controller 1108 in the ES controller 1014.

In addition to the ES depth controller 1108, the ES controller 1014 has stored thereon a 're-center' bit 1110, that can be toggled to initiate a re-centering of the elastic store 1006, and a 're-center_no_variation' bit 1112 that can be toggled to initiate the method described below with respect to FIG. 12. The ES controller 1014 also includes an initial ES depth register 1114, a monitoring period register 1116, a minimum ES depth register 1118, and a margin register 1120.

When the 're-center' bit 1110 is toggled, for example, by a user, the ES depth controller 1108 performs a re-centering of the elastic store 1006. On the other hand, when the 're-center_no_variation' bit 1112 is toggled, for example, by a user, the ES depth controller 1108 performs the following specific method described below with respect to FIG. 12, which is one example implementation of the more general method described earlier with respect to FIG. 5.

First, in step 1202, the ES depth controller 1108 modifies the read pointer 1104 to establish the depth of the elastic store 1006 to be an initial depth. The actual value of the initial depth is implementation specific, but is large enough to allow for subsequent variations in the depth without buffer overflow or buffer underflow, having little or no regard to the delay incurred by having a depth that is potentially much larger than is needed. In the illustrated embodiment, the value of this initial depth is stored in the initial buffer ES register 1114, and is typically half the size of the elastic store 1006.

Next, in step 1204, the ES depth controller 1108 tracks the minimum depth of the elastic store 1006 over a predetermined period of time as the client's network communication data flows through the elastic store 1006 by being written to and subsequently read from the elastic store 1006 and transmitted into the optical network 712. By tracking the minimum depth of the elastic store 1006, the minimum value of the depth of the elastic store 1006 is determined during the predetermined period of time. This value representing the minimum depth is stored in the minimum ES depth register 1118.

The duration of the predetermined period of time in step 1204 is equal to the monitoring period value stored in the monitoring period register 1116. The duration of the predetermined period of time is implementation specific, but is dependent upon the expected traffic characteristics of the data. For example, in the illustrated embodiment, the duration is a function of the duration of an OTN frame and thus may be the duration of one or more rows of an OTN frame, or the duration of one or more OTN frames.

Finally, in step 1206, after the predetermined period of time has expired, the ES depth controller 1108 advances the read pointer 1104 by an amount equal to the minimum elastic store depth determined in step 1204 minus a margin. The value of the margin is stored in margin register 1120.

By performing the method of FIG. 12, the optimal average depth of the elastic store 1006 need not be determined and programmed in advance. Rather, an initial larger depth can be established (step 1202), and the depth subsequently reduced (in step 1206) after monitoring the behaviour of the traffic characteristics of the client's network communication, and its effect on the depth of the elastic store 1006, as the data flows through the elastic store 1006 in step 1204. Additionally, assuming the traffic characteristics of the network communication data remain substantially the same, by performing the method of FIG. 12, the equivalent of a re-centering operation will occur, but in a way that reduces the variation in the average delay across multiple executions of the method of FIG. 12. Notably, the average delay of the client's data in the elastic store 1006 will be the same subsequent to step 1206, regardless of the location of the OTN framing cycle when the method of FIG. 12 is initiated.

Although performing step 1206 may result in some of the client's data being lost when the read pointer is advanced, this one-time loss of client data is acceptable in most OTN systems, and the loss is offset by the benefit of having a reduced average depth subsequent to step 1206, and by the benefit of having reduced variation in the average delay of client data in the elastic store 1006 across multiple executions of the method.

FIGS. 10 and 11 illustrate the ONTU 717 in customer premises 714. As described earlier, the purpose of this ONTU is to map client data to OTN frames. The ONTU 717 interposed between the optical network 712 and the customer premises 716 in FIG. 7 performs the opposite demapping function. That is, it is responsible for stripping the payload from the OTN frame and providing the payload to the client node 719 in the customer premises 716. The ONTU 717 interposed between the optical network 712 and the customer premises 716 has the same structure as that shown in FIGS. 10 and 11, except that the data written to the elastic store is data stripped from an OTN frame, and this data is subsequently read from the elastic store by the client node 719 in the customer premises 716. The ES controller operates in the same manner as described with reference to FIGS. 11 and 12.

Similarly, although not illustrated, each WADM/WXC 713 also includes an elastic store and a corresponding elastic store controller that operates in the same manner described above in relation to FIGS. 11 and 12. The elastic store is provided in the WADM/WXC 713 because the WADM/WXC 713 may, for example, aggregate a plurality of OTN signals being received at one rate (e.g. 2 OTN signals being received at 40 Gbps each) into a single OTN signal transmitted at a higher rate (e.g. at 100 Gbps). In this case, the incoming OTN frames are each demapped and their payload data written to the elastic store. The payload data is then subsequently read from the elastic store and mapped to the higher rate OTN frame.

It can be difficult to determine an optimal buffer depth in situations such as the above when the frame rate and/or frame size of the incoming and outgoing OTN frames are different. The methods described above have the benefit that they can be independent of frame rate and frame size. Instead, in the methods described above, the buffer depth is chosen as an initial value, typically much larger than it needs to be, and then reduced after monitoring the actual network data traffic characteristics and their effect on the depth of the buffer.

Although the foregoing has been described with reference to certain specific embodiments, various modifications thereof will be apparent to those skilled in the art without departing from the scope of the claims appended hereto.

The invention claimed is:

1. A method of operating a buffer for buffering network communication data, the buffer having a plurality of memory entries; the method comprising:
setting at least one of a read pointer and a write pointer to establish a depth of the buffer to be a first value, wherein the write pointer points to a memory entry in which data is written to the buffer and the read pointer points to a memory entry from which data is read from the buffer, and wherein the depth is defined as the number of memory entries in the buffer between the memory entry pointed to by the read pointer and the memory entry pointed to by the write pointer;
monitoring variation of the depth of the buffer for a predetermined period of time during which a plurality of read and write operations occur as network communication data flows through the buffer, wherein said monitoring the variation of the depth of the buffer for the predetermined period of time comprises determining a minimum depth of the buffer during the predetermined period of time;
when the minimum depth of the buffer is greater than zero then:
reducing the depth of the buffer based upon the monitoring of the variation of the depth of the buffer during the predetermined period of time, wherein said reducing the depth of the buffer comprises moving at least one of the read pointer and the write pointer to reduce the depth of the buffer by an amount no greater than the minimum depth of the buffer determined during the predetermined period of time;
wherein said amount by which the depth of the buffer is reduced is equal to the minimum depth of the buffer minus a margin.

2. The method of claim 1 wherein the depth is measured beginning at the memory entry pointed to by the read pointer and moving towards the memory entry pointed to by the write pointer in a direction in which the read and write pointers move during normal operation.

3. The method of claim 1 wherein the margin corresponds to an acceptable window for allowing the depth of the buffer to vary more than the variation during the predetermined period of time.

4. The method of claim 1 wherein the first value is large enough to allow for the variation during the predetermined period of time without buffer overflow or buffer underflow.

5. The method of claim 1 wherein the first value is substantially equal to half the size of the buffer.

6. The method of claim 1 wherein the method is performed when the buffer is to be re-centered.

7. The method of claim 1 wherein the buffer is for buffering network communication data with overhead, and the method is performed when a network traffic characteristic changes.

8. The method of claim 1 wherein the buffer is for buffering network communication data with overhead, and wherein the predetermined period of time is predetermined based on a traffic characteristic of the network communication data.

9. The method of claim 1 wherein the buffer is for use in an Optical Transport Network (OTN), and wherein the predetermined period of time is a function of an OTN frame.

10. The method of claim 9 wherein the predetermined period of time is the duration of one or more rows of an OTN frame, or the predetermined period of time is the duration of one or more OTN frames.

11. A method of reducing network delay variation, the method operating on a buffer for buffering network communication data with overhead; the buffer having a plurality of memory entries; the method comprising:
setting at least one of a read pointer and a write pointer to establish a depth of the buffer to be a first value, wherein the write pointer points to a memory entry in which data is written to the buffer and the read pointer points to a memory entry from which data is read from the buffer, and wherein the depth is defined as the number of memory entries in the buffer between the memory entry pointed to by the read pointer and the memory entry pointed to by the write pointer, the depth being measured beginning at the memory entry pointed to by the read pointer and moving towards the memory entry pointed to by the write pointer in a direction in which the read and write pointers move during normal operation;
determining a minimum depth of the buffer during a predetermined period of time during which a plurality of read and write operations occur as some of the network communication data flows through the buffer;

when the minimum depth of the buffer is greater than zero then moving at least one of the read pointer and the write pointer to reduce the depth of the buffer by an amount no greater than the minimum depth determined during the predetermined period of time;

wherein said amount by which the depth of the buffer is reduced is equal to the minimum depth of the buffer minus a margin.

12. A buffer for buffering network communication data, the buffer comprising:
a plurality of memory entries;
a write pointer for pointing to a memory entry in which data is written to the buffer;
a read pointer for pointing to a memory entry from which data is read from the buffer;
control logic for establishing a depth of the buffer to be a first value, wherein the depth is defined as the number of memory entries in the buffer between the memory entry pointed to by the read pointer and the memory entry pointed to by the write pointer;
a storage unit for storing another value representing a predetermined period of time, after the depth is established as the first value, during which variation of the depth of the buffer is monitored to determine a minimum depth of the buffer as network communication data flows through the buffer via a plurality of read and write operations;
the control logic further for, when the minimum depth of the buffer is greater than zero, then reducing the depth of the buffer based upon the monitoring of the variation of the depth of the buffer during the predetermined period of time, wherein said reducing the depth of the buffer comprises moving at least one of the read pointer and the write pointer to reduce the depth of the buffer by an amount no greater than the minimum depth of the buffer determined during the predetermined period of time;
wherein said amount by which the depth of the buffer is reduced is equal to the minimum depth of the buffer minus a margin.

13. The buffer of claim 12 wherein the depth is measured beginning at the memory entry pointed to by the read pointer and moving towards the memory entry pointed to by the write pointer in a direction in which the read and write pointers move during normal operation.

14. The buffer of claim 12 wherein the buffer is for buffering network communication data with overhead, and wherein the predetermined period of time is predetermined based on a traffic characteristic of the network communication data.

15. The buffer of claim 12 wherein the buffer is for use in an Optical Transport Network (OTN), and wherein the predetermined period of time is a function of an OTN frame.

16. A non-transitory computer readable medium having stored thereon computer readable instructions for execution in one or more processing devices in network communication equipment; the computer readable instructions, when executed, causing the one or more processing devices to operate a buffer for buffering network communication data, the buffer having a plurality of memory entries; the computer readable instructions comprising:
code for setting at least one of a read pointer and a write pointer to establish a depth of the buffer to be a first value, wherein the write pointer points to a memory entry in which data is written to the buffer and the read pointer points to a memory entry from which data is read from the buffer, and wherein the depth is defined as the number of memory entries in the buffer between the memory entry pointed to by the read pointer and the memory entry pointed to by the write pointer;
code for monitoring variation of the depth of the buffer for a predetermined period of time during which a plurality of read and write operations occur as network communication data flows through the buffer, wherein said monitoring the variation of the depth of the buffer for the predetermined period of time comprises determining a minimum depth of the buffer during the predetermined period of time;
code for, when the minimum depth of the buffer is greater than zero, then reducing the depth of the buffer based upon the monitoring of the variation of the depth of the buffer during the predetermined period of time, wherein said reducing the depth of the buffer comprises moving at least one of the read pointer and the write pointer to reduce the depth of the buffer by an amount no greater than the minimum depth of the buffer determined during the predetermined period of time;
wherein said amount by which the depth of the buffer is reduced is equal to the minimum depth of the buffer minus a margin.

17. A buffer for buffering network communication data, the buffer comprising:
a plurality of memory entries;
a write pointer for pointing to a memory entry in which data is written to the buffer;
a read pointer for pointing to a memory entry from which data is read from the buffer;
means for setting at least one of the read pointer and the write pointer to establish a depth of the buffer to be a first value, wherein the depth is defined as the number of memory entries in the buffer between the memory entry pointed to by the read pointer and the memory entry pointed to by the write pointer;
means for monitoring variation of the depth of the buffer for a predetermined period of time during which a plurality of read and write operations occur as network communication data flows through the buffer, wherein the means for monitoring the variation of the depth of the buffer for the predetermined period of time comprises means for determining a minimum depth of the buffer during the predetermined period of time;
means for, when the minimum depth of the buffer is greater than zero, then reducing the depth of the buffer based upon the monitoring of the variation of the depth of the buffer during the predetermined period of time, wherein the means for reducing the depth of the buffer comprises means for moving at least one of the read pointer and the write pointer to reduce the depth of the buffer by an amount no greater than the minimum depth of the buffer determined during the predetermined period of time;
wherein said amount by which the depth of the buffer is reduced is equal to the minimum depth of the buffer minus a margin.

18. A buffer for buffering network communication data, the buffer comprising:
a plurality of memory entries;
a write pointer for pointing to a memory entry in which data is written to the buffer;
a read pointer for pointing to a memory entry from which data is read from the buffer;
control logic for initiating a process that includes establishing a depth of the buffer to be a first value, wherein the depth is defined as the number of memory entries in the buffer between the memory entry pointed to by the read pointer and the memory entry pointed to by the write pointer;

a first storage unit for storing another value representing a predetermined period of time, after the depth of the buffer is established as the first value, during which a minimum depth of the buffer is determined as network communication data flows through the buffer via a plurality of read and write operations;

a second storage unit for storing a margin; wherein, when the minimum depth of the buffer is greater than zero, the depth of the buffer is reducible by the minimum depth minus the margin by altering at least one of the read pointer and the write pointer.

19. A method of operating a buffer for buffering network communication data, the buffer having a plurality of memory entries; the method comprising:

(a) setting at least one of a read pointer and a write pointer to establish a depth of the buffer to be a first value, wherein the write pointer points to a memory entry in which data is written to the buffer and the read pointer points to a memory entry from which data is read from the buffer, and wherein the depth is defined as the number of memory entries in the buffer between the memory entry pointed to by the read pointer and the memory entry pointed to by the write pointer;

(b) determining a minimum depth of the buffer during a predetermined period of time during which a plurality of read and write operations occur as some of the network communication data flows through the buffer; and (c) when the minimum depth of the buffer is greater than zero then moving at least one of the read pointer and the write pointer to reduce the depth of the buffer by an amount no greater than the minimum depth determined during the predetermined period of time; wherein said amount by which the depth of the buffer is reduced is equal to the minimum depth of the buffer minus a margin; and the method further comprising repeating (a) to (c) in response to a predetermined trigger.

20. The method of claim 19 wherein the predetermined trigger is one of: a reset of the buffer; powering up of network equipment in which the buffer resides; network link failure recovery; set up of a new network path; and an imbalance in the input and output rates of data flowing through the buffer.

\* \* \* \* \*